(12) United States Patent
O'Toole, Jr.

(10) Patent No.: US 7,822,685 B1
(45) Date of Patent: Oct. 26, 2010

(54) METHOD AND SYSTEM FOR DIGITAL RIGHTS MANAGEMENT BROKERING AND DIGITAL ASSET SECURITY TRANSCODING

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 10/411,819

(22) Filed: Apr. 9, 2003

(51) Int. Cl.
*G06F 21/00* (2006.01)

(52) U.S. Cl. .............. 705/51; 705/52; 705/53; 705/54; 705/55; 705/56; 705/57; 705/58; 705/59; 705/38; 705/44; 361/91; 380/23; 713/185; 713/201

(58) Field of Classification Search ............ 705/51–59, 705/44, 39; 380/23; 361/91; 713/185, 201
See application file for complete search history.

(56) References Cited

U.S. PATENT DOCUMENTS

| | | | | |
|---|---|---|---|---|
| 4,991,171 A | * | 2/1991 | Teraslinna et al. | 370/388 |
| 5,629,980 A | * | 5/1997 | Stefik et al. | 705/54 |
| 5,892,900 A | * | 4/1999 | Ginter et al. | 726/26 |
| 5,987,440 A | * | 11/1999 | O'Neil et al. | 705/54 |
| 5,991,399 A | | 11/1999 | Graunke et al. | 380/4 |
| 6,098,056 A | | 8/2000 | Rusnak et al. | 705/75 |
| 6,226,618 B1 | * | 5/2001 | Downs et al. | 705/1 |
| 6,289,455 B1 | | 9/2001 | Kocher et al. | 713/194 |
| 6,321,374 B1 | | 11/2001 | Choy | 717/2 |
| 6,331,865 B1 | | 12/2001 | Sachs et al. | 345/776 |
| 6,338,044 B1 | * | 1/2002 | Cook et al. | 705/14 |
| 6,363,357 B1 | | 3/2002 | Rosenberg et al. | 705/26 |
| 6,389,541 B1 | * | 5/2002 | Patterson | 705/53 |
| 6,424,715 B1 | | 7/2002 | Saito | 380/201 |
| 6,457,640 B2 | | 10/2002 | Ramachandran et al. | 235/379 |
| 6,658,568 B1 | * | 12/2003 | Ginter et al. | 705/51 |
| 2003/0204602 A1 | * | 10/2003 | Hudson et al. | 709/228 |

\* cited by examiner

*Primary Examiner*—Calvin Loyd Hewitt, II
*Assistant Examiner*—Cristina Owen Sherr
(74) *Attorney, Agent, or Firm*—Stolowitz Ford Cowger LLP

(57) ABSTRACT

A computer-implemented method and system for DRM brokering and digital asset security transcoding comprising utilizing a broker for converting content from one format into one or more alternative DRM-protected formats for distribution to end-users. The broker operates an escrow system for securing and tracking the content and information about the content and encryption keys associated with a plurality of DRM content formats. The broker further provides a common inter-DRM log format for receiving usage transaction logs and payment logs associated with transcoding and distribution the content in one or more DRM-protected content formats.

20 Claims, 5 Drawing Sheets

101
Using generally available coding program, creating content for distribution in an unencrypted format on a selected media

102
Selecting a particular DRM-protection method and its associated encryption key and algorithms; encrypting the content and information associated with the content including creating a media encryption key; encrypting the media using a compatible algorithm and the key; and packaging the content with an envelope meta-data that references a license

103
Distributing protected content to end-users

104
Licensing to the end user based on a transaction between the publisher and the end user

105
Allowing end-user access to content by a DRM-enforcing playback software key provided under the license

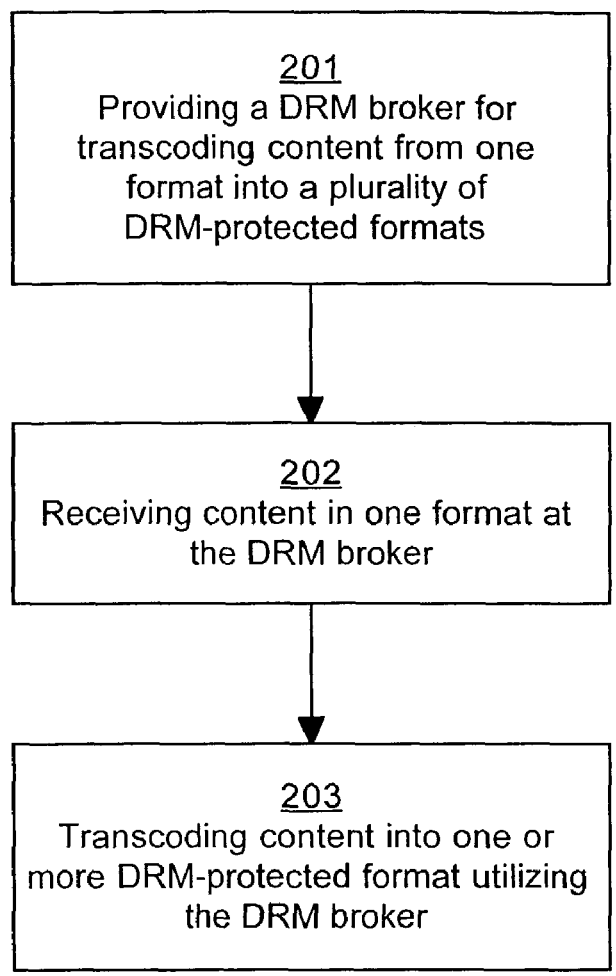

| Column 1 | Column 2 |
|---|---|
| Publisher | name, contact, id, ... |
| DRM | name, server, DRM system-id, ... |
| Content | universal unique id, title, publisher attributes, ... |
| Keys | universal unique id, DRM id, key id, optional policies, ... |
| Policies | name, publisher, key size, valid time, geographical restrictions, ... |
| Other information | .... |

METHOD AND SYSTEM FOR DIGITAL RIGHTS MANAGEMENT BROKERING AND DIGITAL ASSET SECURITY TRANSCODING

FIELD OF INVENTION

Embodiments of the present invention relate to Digital Rights Management (DRM) and digital asset security. In particular, embodiments of the present invention relate to a computer-implemented method and system for brokering the flow of DRM-protected content in a framework that specifies how the publishers, brokers, distributors and end-users of the content interact for interoperability among incompatible DRM formats.

BACKGROUND

The Internet and other networked computers have dramatically changed the way in which digitized assets such as music, films, books, documents and streams, referred to herein as content, are produced, distributed and consumed. For example, downloading content from the Internet has gained widespread acceptance among computer-savvy users because it provides immediate access to content without requiring a trip to a store to purchase physical media containing the content such as a CD or a DVD. However, due to the ease with which content can be downloaded, owners of commercially valuable content are very reluctant to place content on the network in the absence of adequate safeguards for fear that the content would be pirated and used unlawfully.

However, as the market for commercial content evolves and as owners of valuable content explore ways to enable different business models for content distribution to end-users, increasingly the publishers are motivated to place high premium, high-valued content on the networks despite the potential for piracy and unlawful use. In this regard, the publishers are encouraged by the availability of various e-commerce systems capable of encrypting the content in a format that is secure for distribution to licensed end-users. In these e-commerce systems, a critical component is digital rights management (DRM).

DRM is a set of technologies useable for protecting content while allowing the publisher of the content to maintain close contact with end-users. With DRM technology, content is encrypted in a format that allows only for a licensed user to access the content. Generally, access is provided by a decryption key obtained from the publisher under a license. With DRM technology, publishers can place content on the network with some assurance that the content will be secure and that its distribution and sales will be properly administered.

In general, a publisher creates media content using an unencrypted format, e.g. CODEC. The publisher then selects a particular DRM system and its associated encryption key and algorithms for encrypting the content and information associated with the content. For example, the encrypted content is packaged in a meta-data format that includes a reference to a license agreement that authorizes distribution of the content to a licensed end-user. For the end-user to access the DRM-protected content, he must use a DRM-enforcing playback software key obtained from the referenced license.

Presently, many commercial products embodying DRM-protection methods are available for use in protecting content. A common goal of these methods is to provide protection in accordance with rights granted under a license by the publisher of the content. In protecting and distributing content, there is an intricate framework connecting the content with the management of the content including the use of encryption keys, authentication methods, end-user identity, device identity, payment and other electronic commerce functions. Several DRM vendors including IBM, Intertrust, Microsoft and Cisco have published portions of their DRM framework presumably to encourage widespread use of these proprietary DRM-protection methods.

A problem arising with the proliferation of proprietary DRM-protection methods is that since the methods are not based on any common DRM standard, content protected by one DRM method usually cannot be accessed by anther DRM method. This incompatibility has led to a significant fragmentation in the market with the result that publishers and end-users, interested in publicizing protected content as widely as possible are left with an unattractive set of choices.

One possible choice is for the end-users to become familiar with several of DRM-protection methods in anticipation that they will purchase a variety of DRM-protected content; alternatively, the publishers could publish the content under several DRM-encrypting formats in the hope that such coverage be adequate for their target markets. Yet another possibility is that, by consensus the vendors will cooperate to develop DRM-based products that comply with a common DRM standard.

In the present competitive environment it is not likely that a common DRM standard will be evolve in view of the perception that each vendor, besides providing the DRM product, is also seen to be providing a partnering services to assist the publishers to market the content in a target market. For example, in marketing protected content, one DRM vendor may be perceived as more desirable by a publisher because that vendor provides a good design choice for high-value lower-volume content; similarly, another vendor may be perceived as more desirable because it provides good a design choice for low-value higher-volume content for another target market.

Accordingly, in protecting content on computer networks, there is a need for a better way to allow for interoperability such that content protected by a DRM format can be accessed and used under another DRM format without jeopardizing the rights of the publisher, or diminishing the obligations of the end-user.

SUMMARY OF INVENTION

Embodiments of the present invention provide a computer-implemented method involving the use of a broker to transform the DRM-protected content into a plurality of DRM-protected formats for widespread distribution. In one embodiment, the present invention comprises providing a DRM broker to act as a proxy for the publisher interested in publishing the content in a plurality of DRM-protected formats. The content and content information comprising encryption keys, transaction logs, licenses, payments and payments receipts are received from the publisher at the DRM broker. The content and content information is transcoded into a plurality of DRM-protected formats utilizing the DRM broker. The plurality of DRM-protected formats is then distributed. The present invention also provides for a computer-implemented system and a computer-useable medium for practicing the invention.

BRIEF DESCRIPTION OF DRAWINGS

The accompanying drawings, which are incorporated in and form a part of this specification, illustrate embodiments of the invention and, together with the description, serve to explain the principles of the invention:

FIG. 1 is a flowchart diagram illustrating steps of an exemplary process for generating DRM-protected content, in accordance with one embodiment of the present invention.

FIG. 2 is a flowchart diagram illustrating steps of a DRM brokering process in accordance with one embodiment of the present invention.

FIG. 3 is a schematic illustrating a database employable in DRM brokering in accordance with one embodiment of the present invention.

DETAILED DESCRIPTION OF INVENTION

Figure 4:
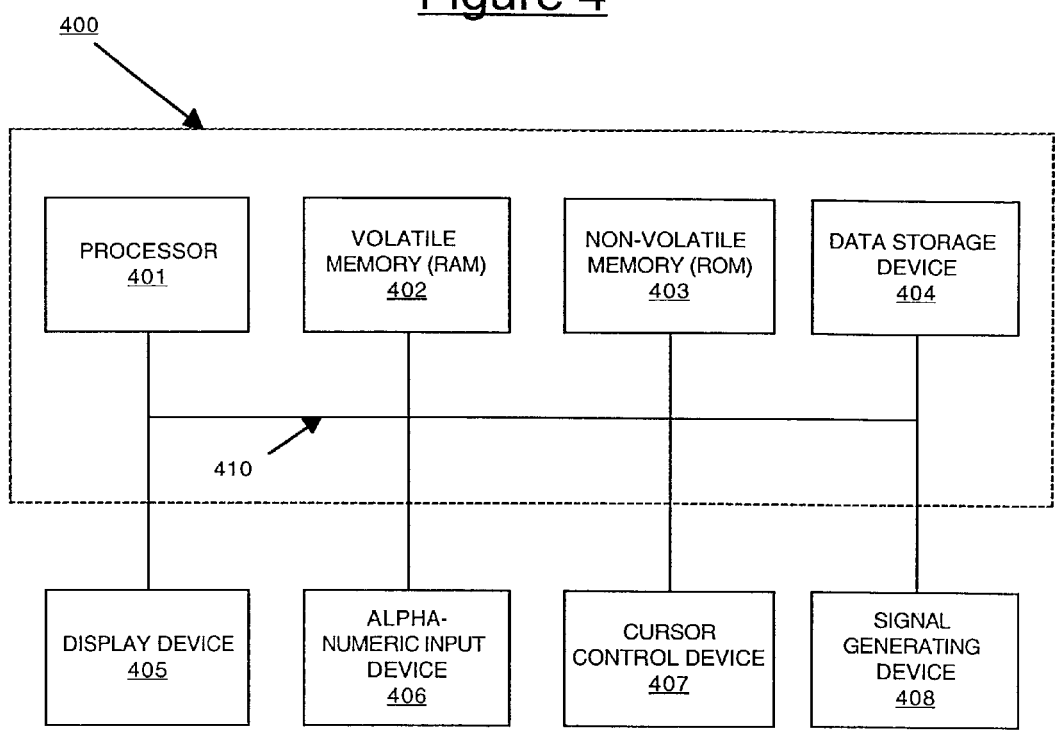
FIG. 4 is a block diagram of an exemplary computer system platform upon which embodiments of the present invention may be practiced.

The present invention is a framework for brokering the flows of DRM-protected content and information pertaining to the protected content comprising encryption keys, transaction logs, payments and payment receipts, available initially in either a non-protected format or in a DRM-protected format. The framework specifies how publishers, the DRM-broker, distributors and end-users of the content can interact for mutual benefit using DRM technology to protect and market the content.

FIG. 1 provides a brief, general description of an exemplary process 100 for generating DRM-protected content. Those skilled in the art will appreciate that in practice, process 100 illustrated in FIG. 1 is performed with greater particularity by using, for example, computer-executed software modules that includes routines, programs, objects, components, data structures, etc., to execute particular tasks for generating DRM-protected content. For the present purposes, however, the exemplary DRM-protection process of FIG. 1 includes step 101 whereby a publisher, using generally available coding software e.g. CODEC, creates content in an unencrypted format on a selected media. At step 102, the publisher selects a particular DRM-protection method with its associated encryption key and algorithms, and encrypts the content and information in the DRM-protected format. The encryption includes creating a media encryption key, and encrypting the media using a compatible algorithm and the key, and packaging the content with an meta-data envelope that authorizes the use of the encrypted content. In one embodiment, the DRM-packaged content contains the encrypted content and a header (e.g. the meta-data envelope) containing a URL or other identifying reference. The reference refers to a server on the Internet that operated by the publisher or distributor, wherein the server is operable to interact with the client player (e.g., the end-user) to create a license. It should be appreciated that the meta-data refers to the publisher's licensing authority or license server.

Subsequently, the encrypted DRM-protected content is distributed to end-users, as shown at step 103. In some situations the DRM-protected content is distributed to the end-users before they are licensed; they may never be licensed and may never use the content. In other situations, users get licensed but do not actually take delivery of the license until after they get the DRM-protected content. In others, they may get their license and get the content later. It should be appreciated that an end-user may obtain a license for DRM-protected content at any time, and is not dependent on the distribution of the DRM-protected content itself.

At step 104, a license is granted to the end-user based on a transaction between the end-user and the publisher's licensing authority. In one embodiment, the license comprises a DRM-enforcing playback key. Access to the DRM-protected content (or presentation and display of the content) is performed by some DRM-enforcing software. For DRM-enforcing software to be enabled to provide access to the content, there must also be available a license for the content, and the license normally contains some decryption key. At step 105, the end-user is provided access to DRM-protected content by the DRM-enforcing playback software key provided under the license. Thus, for an end-user to access the DRM-protected content, he must use a DRM-enforcing playback software key authorized under the license.

As an aid in understanding the invention, it is useful to consider further how a proprietary DRM system, referred to herein as "CPX", is used to protect content. Suppose that CPX is the system that a publisher uses to protect content in a DRM-encrypted format. CPX could be, for example, Adobe's eBook system, or Microsoft's DRM system, or any similar systems. For end-users to access the DRM-protected content they must use a decrypting device authorized under a license. The decryption device, usually in the form of software, is constructed such that at least in the absence of sophisticated piracy efforts, it decrypts the content only if it obtains a decryption key from a local key cache which is loaded with a digital license and is authorized by the publisher consequent upon a payment and licensing transaction between the publisher and the end-user.

While the above-described scenario using CPX will be adequate for those publishers and end-user interested in protecting content in only one DRM-protected framework, for others interested in having the content available under several DRM-protected formats, the above scenario will be inadequate as may be appreciated by considering the following scenarios. Suppose an alternative DRM system, "CPX1", is widely used in a geographic region to protect content, e.g. Asia or North America. Suppose also that a publisher has initially created a very popular work such as an eBook under the CPX format and is interested in marketing the eBook in the CPX1 format. Unless the publisher's CPX's format is compatible with CPX1, the publisher would not be able to pursue the opportunity in the CPX1 format. Similarly, potential opportunities can be lost if, for example, content is generally published under a DRM system, e.g. "CPX2" that works only with a Microsoft's desktop document display software popular in a particular geographic region, but the publisher's existing computer systems are only configured and prepared to perform DRM-protected publishing in the CPX framework, not in another DRM framework. These examples illustrate a fragmentation problem caused by the proliferation of proprietary DRM systems that leaves publishers and consumers with an unattractive set of choices to make.

As previously noted, a solution to the fragmentation problem is for the end-users to learn a variety of DRM formats for anticipated use with a variety of DRM protected content. Alternatively, the publishers could publish in more than one DRM format depending on the target markets. A third possibility is that DRM system vendors will collaborate to produce products that conforms to a single DRM standard; but, as previously noted, in the present business environment standardization will not likely occur in view of the perception that the value of a DRM vendor's offerings not only provides DRM-protection technology, but also provides a partnering service that enables the publishers to successfully market their content. Hence, none of these solutions is adequate to address the problem of fragmentation and proliferation of incompatible DRM-protected formats.

Embodiment of the present invention address the above-noted fragmentation and incompatibility problem by providing for a DRM broker whose role is to act as a trusted proxy for a publisher interested in creating multiple DRM-protected from one content created in one framework that he understands and is happy with, say CPX1, but wants to address a larger market opportunity for the content than the CPX1 format by itself makes feasible. This objective is achieved by process 200 of the invention as set forth in FIG. 2. At step 201 there is provided for a DRM broker capable of transcoding content from one format into one or more alternative DRM-protected formats. At step 202, the process provides for receiving the content at the broker. At step 203, using the broker transcoding the content into one or more DRM-protected formats. Thus, with the present invention, regardless of the technical limitations of one format, e.g., CPX1 and regardless of the penetration and/or installed-base of CPX1, the publisher of the content can reach end-users interested in acquiring content under a competing DRM-protected format such as, for example, CPX2 and CPX3 using the DRM broker of the invention. For the DRM-broker to provide this function it must address four considerations.

First, the DRM broker must operate concurrently on all the computing systems required for each of the N different DRM frameworks. In one embodiment, the N different DRM frameworks might all run on a single computer. In another embodiment, each system may require several computers in each of several locations, so that the total number of servers involved is large. In another embodiment, there are at least N license servers, one per DRM system, wherein each of the N license servers is configured to communicate with a key-escrow and signing system.

Secondly, since the DRM broker of the invention must ensure a secure, high-integrity key-escrow system, the broker must create and track a variety of keys as required for each of the N DRM systems on behalf of several publishers and their content. In principle this can be achieved using a very secure key-database system with a schema well known in the art for supporting a relational data base system. Such a system typically comprises rows and columns containing information pertaining to several variables of the content, for example, the publisher, the DRM, the keys, the policies of the publisher and other pertinent information. An example of such a relational database table 300 in simplified form is shown in FIG. 3. This table comprises rows and columns wherein Column 1 contains, for example, information as set forth above, and Column 2 contains attributes of this information. It will be appreciated by those skilled in the art that table of FIG. 3 is very simplified representation of well known relational database systems generally available to implement this invention.

In practice, since the publishing keys safeguard a wide range of content belonging to different publishers, some of whom are acting as limited agents of other publishers, authors and musicians, the database will require other tables describing what key-management policy each publisher has requested for each piece of content, what DRM systems the publisher has authorized for that content, and also that the keys are not to be stored in the same database, but rather is stored in some other key-escrow system operated by a different entity who would hold the keys and continuously fulfill the DRM-broker's requests to sign new licenses using those keys. This kind of key escrow would help enable the publisher to audit the broker and comprise procedures that, for example, would ensure that keys are kept in separate, secure databases; that licenses are signed on demand; that every signature action is securely logged; that a trusted auditor, not a DRM broker, operates and vouches for the system's log integrity; and that logs are available for the publisher for license audit, etc.

Thirdly, the DRM broker would likely want to define a common inter-DRM log format system into which all usage transaction logs and payment logs from each of the N DRM systems could be converted. For scalability reasons, the logs from the various systems operated by the DRM Broker would probably never be merged and aggregated together, but each log fragment would be converted into the common format, sorted by publisher-id and/or content-item-id, and then sent to be merged with other log fragments for each of the broker's publisher-customers, then to be converted into the format chosen by the publisher, for example log formats from a particular DRM system, and made available to that publisher. In this system, various DRM systems; log entries can be converted into a common format covering all fields from all DRM systems; however, although the conversion to a single system log is possible, and the publisher can consume content in any format, the conversion may occur with some information loss.

Fourthly, the DRM broker must have a means for taking content from the publisher and re-publishing it in each of the N different DRM systems that the publisher desires. If the publisher trusts the DRM-broker sufficiently, then the content can be provided to the broker in an open format not necessarily a plain text format, but in a non-DRM-protected format. If the content is encrypted, it could be shared by public-key encryption between the publisher and broker. If the broker is trusted and can get the content in open format, then the broker can publish the content into each of the alternative formats using their respective procedures. With presently known DRM systems, the publishing system requires the content be available in open format with some form of identification, an encryption keys, and other meta-data that can, in most cases, be embedded into the DRM-protected form of the content. In this instance the DRM broker will attach the meta-data information identifying himself or a publisher-specific alias of himself as the publisher, and additional meta-data tags referencing the key-escrow database that the broker uses to act on behalf of the publisher, in addition to content-identifying information supplied by the publisher with the content.

To achieve more complete compatibility with the publisher's systems, or to deal with possible distrust of the broker, the broker can accept the content from the publisher in the DRM-protected format used by the publisher. Under these circumstances, the broker will have a fifth problem to solve, which is how to break open the publisher's format to convert it into an alternative format. This consideration, referred to herein as "digital asset security transcoding", may not be solvable for all source and target formats. However, there are several cases that are feasible and practical, as summarized below:

(1) The format is breakable: Where the publisher's format is known to be breakable through attacks by, for example, brute-force computation, key cracking, known plain-text attacks, or whatever, it is probably useful and practical for the broker to do this as part of the content-conversion service provided to the publisher. For example, the publisher might want the brokering/conversion service precisely because his chosen method, CPX1, is now considered vulnerable and therefore obsolete. Hence, the publisher is not using CPX1 for publishing to consumers, but it is still convenient to do so in business-to-business (B2B) transactions with his broker(s). Since CPX1 is now easy to crack, the broker does this, opens the content, and republishes it in superior DRM format. Similarly, the broker could crack the content and republish it in the framework of CPX1, but using a newer more powerful cipher, or a larger key size. This scenario is analogous to using an SSL-acceleration appliance to use strong ciphers for external SSL, but use weak ciphers for performance reasons and backward compatibility with existing servers in a data center. Examples of candidates for such treatment include Adobe eBook, DIVX, and many other existing low-grade DRM-enhanced formats.

(2) The format is licensable: Where the publisher's format is a public framework, or where its decryption methods are licensable, for example under license, L1, available from a vendor, the broker can accept the content in the publisher's format, then obtain a limited-use license, L2, from the publisher (e.g., the broker's customer), and perform a decryption to obtain the content in open form. In this instance the broker might be violating the terms of license L2, but it would be appreciated that the broker and publisher would want the broker to obtain, in license L1, sufficient permission from the DRM system licensor, to permit a decryption to expose the content in its original digital format. Whether this is possible might depend on competitive aspects of the licensing strategy, but it seems likely to be possible for most formats that aspire to support desktop content consumption, and certainly for any DRM system where the publisher can issue the broker an L2 license for unlimited use including full-fidelity, all-digital content, ability to print, reuse, etc.

(3) If the publisher format, for example, CPX1, and the target format, CPX2, support the same encryption cipher, then the broker can convert the DRM-protected content from one format to another without the necessity of decrypting the content to obtain an open or plain text format. In this instance, only the envelope, meta-data, and key and license details must be re-created for the DRM system in CPX2 format, and doing so may require access to the secret keys used to encode the content into CPX1 format initially. Often, however, the conversion could be done without those keys, but the step of issuing a new limited-use license within DRM system in CPX2 will require access to the master encryption key. In this scenario, the DRM broker could handle the conversion and publishing steps, but have the license-issuing step be performed by a third-party auditor who operates a license-signing system under contract with the broker and according to the broker's specifications, but guarantees access to complete transaction logs any time the publisher wants to audit the broker.

(4) If the broker cannot perform any of the above, the broker could resort to a scheme whereby the broker obtains an unlimited-use license L3 from the publisher, takes the publisher-protected content, CPX1 and L3 together, and puts them through the publishing process for another DRM system CPX2. This will always work, but requires that when a consumer using system CPX2 receives the content, their desktop will have to do a double-decryption, and the broker would have to arrange to configure its CPX2-compatible content packaging to automate the process of doing the CPX1 decryption for the consumer. This complexity could reduce the value of the brokering function, and thus is only be practical on high-performance desktop endpoints. This scenario of double-encrypted content is probably not a preferred operational mode for the broker.

The present invention thus advantageously enables publishers to stick to a favorite DRM scheme in initially formatting their content, but subsequently allows for the broker to re-publish the content in a variety of other formats.

EXEMPLARY HARDWARE UPON WHICH EMBODIMENTS OF THE PRESENT INVENTION MAY BE IMPLEMENTED

Refer now to FIG. 4 which illustrates an exemplary computer system 400 upon which embodiments of the present invention may be practiced. In general, computer system 400 comprises bus 410 for communicating information, processor 401 coupled with bus 410 for processing information and instructions, random access (volatile) memory (RAM) 402 coupled with bus 410 for storing information and instructions for processor 401, read-only (non-volatile) memory (ROM) 403 coupled with bus 410 for storing static information and instructions for processor 401, data storage device 404 such as a magnetic or optical disk and disk drive coupled with bus 410 for storing information and instructions.

In one embodiment, computer system 400 comprises an optional user output device such as display device 405 coupled to bus 410 for displaying information to the computer user, an optional user input device such as alphanumeric input device 406 including alphanumeric and function keys coupled to bus 410 for communicating information and command selections to processor 401, and an optional user input device such as cursor control device 407 coupled to bus 410 for communicating user input information and command selections to processor 401. Furthermore, an optional input/output (I/O) device 408 is used to couple computer system 400 onto, for example, a network.

Display device 405 utilized with computer system 400 may be a liquid crystal device, cathode ray tube, or other display device suitable for creating graphic images and alphanumeric characters recognizable to the user. Cursor control device 407 allows the computer user to dynamically signal the two-dimensional movement of a visible symbol (pointer) on a display screen of display device 405. Many implementations of the cursor control device are known in the art including a trackball, mouse, joystick or special keys on alphanumeric input device 406 capable of signaling movement of a given direction or manner of displacement. It is to be appreciated that the cursor control 407 also may be directed and/or activated via input from the keyboard using special keys and key sequence commands. Alternatively, the cursor may be directed and/or activated via input from a number of specially adapted cursor directing devices.

Figure 5:
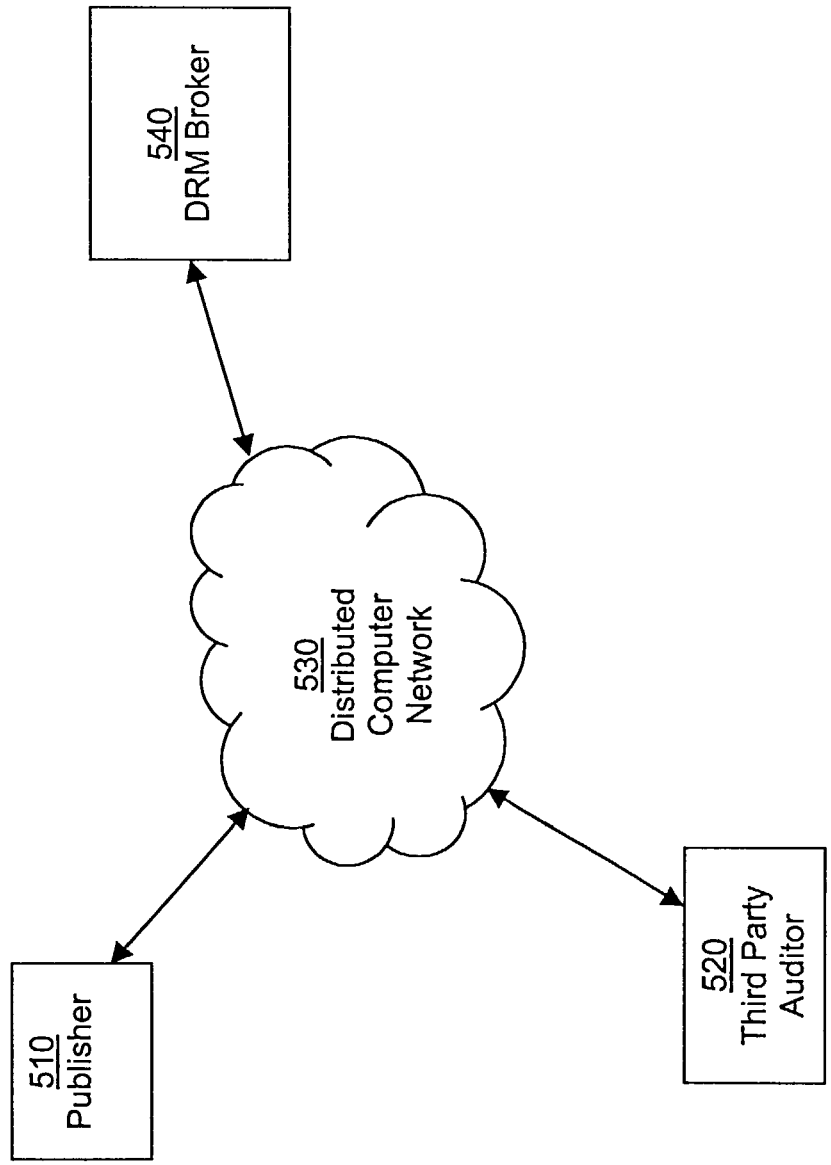
FIG. 5 is a block diagram of an exemplary system upon which embodiments of the present invention may be practiced.

FIG. 5 is a block diagram of an exemplary system 500 upon which embodiments of the present invention may be practiced. As depicted in FIG. 5, system 500 includes a DRM broker 540 communicatively coupled to publisher 510 and third party auditor 520 via a distributed computer network 530. DRM broker 540 functions as the central communications point for the DRM brokering operations. In one embodiment, DRM broker 540 performs a method for brokering DRM-protected content (e.g., process 200 of FIG. 2). Publisher 510 and third party auditor 520 communicate with DRM broker 540 via the communications protocols of distributed computer network 530, hereafter simply network 530. DRM broker 540 conducts the DRM brokering operations based on the content as received from publisher 510.

It should be noted that the embodiment of the present invention depicted in FIG. 5 (e.g., system 500) is implemented as a software based process executing on the computer system platform of DRM broker 540. The basic components of the computer system platforms are shown in the example computer system 400 of FIG. 4.

Referring still to FIG. 5, network 530 includes well know network technologies. For example, network 530 can be implemented using LAN technologies (e.g., Ethernet, Token-ring, etc.), the Internet, or other wired or wireless network technologies. The communications links between exchange DRM broker 540, publisher 510, third party auditor 520 and network 530 can be implemented using, for example, a telephone circuit, communications cable, optical cable, wireless link, or the like.

While the present invention has been described in particular embodiments, it should be appreciated that the present invention should not be construed as limited by such embodiments but rather be construed in accordance with the following claims.

The invention claimed is:

1. A method, comprising:
   receiving, by a DRM Broker computer, original content to be protected with a predetermined DRM (Digital Rights Management) scheme;
   identifying a publisher from a plurality of different publishers by inspecting the original content prior to a first DRM encryption, the identified publisher being associated with the original content;
   comparing the identified publisher to a key-escrow database, the key-escrow database mapping the plurality of different publishers to different DRM encryption formats and associating the different DRM encryption formats with one or more of a plurality of encryption keys;
   selecting a first DRM encryption format based on an identity of the identified publisher;
   transcoding the original content, at the DRM Broker computer using the selected first DRM encryption format, the transcoding producing a first DRM encrypted instance of the original content;
   selecting a second DRM encryption format according to the comparison of the identified publisher to the key-escrow database, wherein the second DRM encryption format is different from the first DRM encryption format;
   additionally transcoding the original content, at the DRM Broker computer using the second DRM encryption format, the additional transcoding producing a second different DRM encrypted instance of the original content;
   tracking encryption keys selected from the plurality of encryption keys associated with each of the first and second DRM encryption formats; and
   attaching, by the DRM Broker computer, meta-data to the first DRM encrypted instance of the original content and the second DRM encrypted instances of the original content, the meta-data including: an identity of the DRM broker computer conducting the transcodings and an identity of the key-escrow database.

2. The method of claim 1, wherein the method further comprises distributing both differently DRM encrypted instances of the original content over a packet switched network.

3. The method of claim 2, wherein the original content is received in an original DRM encrypted format over the packet switched network the method further comprising:
   decrypting the original DRM encryption format before performing the transcodings.

4. The method of claim 3, wherein the key-escrow database also maps different key-management policies to the different publishers, the key-management policies corresponding to keys that are used to sign licenses for the original content, and the method further comprises:
   identifying one of the key-management policies according to the comparison of the identified publisher to a key-escrow database; and
   managing ones of the keys that are associated with the first and second DRM encrypted instances according to the identified key-management policies.

5. The method of claim 4, wherein the key-escrow database also maps different key storage options to the different publishers, the different key-storage options consisting only of local storage of the keys and remote storage of the keys, and the method further comprises:
   selecting between local and remote storage of the associated keys according to the comparison of the identified publisher to a key-escrow database; and
   storing the keys according to the selection.

6. The method of claim 5, further comprising generating a common inter-DRM log format for receiving usage transaction logs and payment logs associated with the distribution of the differently DRM encrypted instances of the original content.

7. The method of claim 1, wherein the meta-data further includes information pertaining to the publisher of the original content; and
   the key-escrow database further comprises:
   a first table for mapping each of the plurality of different publishers to different DRM encryption formats, publishing policies and respective keys; and
   a second table for mapping discrete elements of content provided by a particular publisher of the plurality of different publishers to particular DRM encryption formats and key-management policies.

8. The method of claim 7, wherein the DRM broker computer distributes the differently DRM encrypted instances of the original content, and wherein licensing information for the differently DRM encrypted instances of the original content is provided by a third-party auditor operating a license-signing system.

9. The method of claim 8, wherein the third party auditor maintains a transaction log and provides access to the transaction log for auditing the DRM broker computer.

10. The method of claim 9, wherein the key-escrow database comprises a computerized key-escrow database system.

11. A system, comprising:
    means for receiving, original content to be protected with a predetermined DRM (Digital Rights Management) scheme;
    means for identifying a publisher from a plurality of publishers as being associated with received original content by inspecting the received original content prior to a first DRM encryption, to identify the publisher from a plurality of different publishers, the identified publisher being associated with the received original content;
    means for comparing the identified publisher to a key-escrow database, the key-escrow database including a means for mapping the plurality of different publishers to different DRM encryption formats and associating one or more encryption keys with each of the different DRM encryption formats;
    means for selecting a first DRM encryption format according to the comparison of the identified publisher;
    means for transcoding the original content using the first DRM encryption format to produce a first DRM encrypted instance of the original content;
    means for selecting a second DRM encryption format according to the comparison of the identified publisher, wherein the second DRM encryption format is different from the first DRM encryption format;

means for additionally transcoding the original content using the second DRM encryption format, the additional transcoding producing a second DRM encrypted instance of the original content;

means for outputting the differently DRM encrypted instances of the original content, wherein the means for outputting includes a DRM broker computer;

means for tracking encryption keys associated with the first and second DRM encryption formats according to the comparison of the identified publisher; and means for attaching meta-data to the first and second DRM encrypted instances of the original content, the meta-data identifying: the means for outputting the first and second DRM encrypted instances of the original content including the DRM broker computer and the key-escrow database, the meta-data including: an identity of the DRM broker computer conducting the transcodings and an identity of the key-escrow database.

12. The system of claim 11, wherein the means for receiving, the mapping means, the tracking means, the identifying means, the means for comparing, the selecting means, the transcoding means, the outputting means and the attaching means are implemented in one or more computers separated from the publishers via an intervening packet switched network such that the computers operate as a remote trusted DRM-encryption proxy for the publishers.

13. The system of claim 12 wherein the system addresses DRM fragmentation by allowing the publishers to provide the protected original content to a plurality of customers that each conform to different DRM standards.

14. The system of claim 11, further comprising means for generating a common inter-DRM log format for receiving usage transaction logs and payment logs associated with transcoding the original content using the selected DRM encryption formats.

15. The system of claim 14, further comprising:
means for selecting a key-management policy from a plurality of different key management policies according to the identified publisher; and
means for associating the selected key management policy with the differently DRM encrypted instances of the original content.

16. The system of claim 12 further comprising:
means for determining whether the received original content includes publisher-formatted DRM encryption that is different than the selectable DRM encryption formats;
means for determining whether the included publisher-formatted DRM encryption is vulnerable to known attacks; and
means for attacking the publisher-formatted DRM encryption when vulnerable, the attacking means removing the publisher-formatted DRM encryption from the content prior to transcoding.

17. A non-transitory computer-useable medium having computer-executable instruction code embodied thereon for causing a computer system to execute a computer-implemented method for brokering DRM-protected content and for digital asset security transcoding stored thereon, the method comprising:
operating an escrow system at a DRM broker computer, the escrow system for tracking a plurality of encryption keys each associated with respective ones of a plurality of DRM-protected content formats;
receiving original content at the DRM broker computer, the DRM broker computer for transcoding the original content into a plurality of instances of DRM-protected content formats;
identifying a publisher of the original content from a plurality of different publishers by inspecting the original content prior to transcoding the original content into the plurality of DRM-protected content formats, the identified publisher being associated with the first original content;
determining one or more different authorized DRM-protected content formats associated with the identified publisher by comparing the identified publisher in a key-escrow database, the key-escrow database for mapping the plurality of different publishers to a plurality DRM-protected content formats, wherein each publisher is associated with two or more of the DRM-protected content formats;
selecting a first DRM encryption format according to the comparison of the identified publisher in the key-escrow database;
transcoding the original content, at the DRM Broker computer using the selected first DRM encryption format, the transcoding producing a first DRM encrypted instance of the original content;
a second DRM encryption format according to the comparison of the identified publisher in the key-escrow database, wherein the second DRM encryption format is different from the first DRM encryption format; and
additionally transcoding the original content, at the DRM Broker computer using the second DRM encryption format, the additional transcoding producing a second DRM encrypted instance of the original content, wherein the second DRM encrypted instance of the original content is different from the first DRM encrypted instance of the original content;
tracking encryption keys associated with the first and second DRM encryption formats indicated in the key-escrow database; and
attaching by the DRM Broker computer, meta-data to the first and second instances of DRM-protected original content, the meta-data identifying: the DRM broker computer operating the escrow system and the key-escrow database, the meta-data including: an identity of the DRM broker computer conducting the transcodings and an identity of the key-escrow database.

18. The non-transitory computer-useable medium of claim 17, wherein the computer-executable instruction code embodied therein causes the computer system to perform transcoding the original content into the first and second instances of DRM-protected original content, the original content comprising DRM-protected and non-DRM-protected content.

19. The non-transitory computer-useable medium of claim 17, wherein the computer-executable instruction code embodied therein causes the computer system to further perform tracking content information comprising a plurality of DRM formats, a plurality of content and a plurality of licensed users of the content.

20. The non-transitory computer-useable medium of claim 17, wherein the key-escrow database is further for mapping attributes of the plurality of DRM formats to the original content and licensed users of the original content.

* * * * *

UNITED STATES PATENT AND TRADEMARK OFFICE
CERTIFICATE OF CORRECTION

| | | |
|---|---|---|
| PATENT NO. | : 7,822,685 B1 | Page 1 of 1 |
| APPLICATION NO. | : 10/411819 | |
| DATED | : October 26, 2010 | |
| INVENTOR(S) | : O'Toole, Jr. | |

It is certified that error appears in the above-identified patent and that said Letters Patent is hereby corrected as shown below:

At column 12, line 9, please replace "the first original" with --the original--.
At column 12, line 16, please replace "DRM-protected" with --of DRM-protected--.
At column 12, line 26, please replace "a second DRM" with --selecting a second--.

Signed and Sealed this
Twenty-seventh Day of September, 2011

David J. Kappos
*Director of the United States Patent and Trademark Office*